United States Patent
Black et al.

(10) Patent No.: US 12,204,433 B1
(45) Date of Patent: Jan. 21, 2025

(54) AUGMENTING PARSERS BY ADDED PARSER STAGES

(71) Applicant: Google LLC, Mountain View, CA (US)

(72) Inventors: James Paul Black, Sunnyvale, CA (US); Adityashankar Kini, San Carlos, CA (US); Dwaipayan Dutta, Bangalore (IN); Adam Licata, South Orange, NJ (US); Ashish Garg, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/497,271

(22) Filed: Oct. 30, 2023

(51) Int. Cl.
*G06F 15/173* (2006.01)
*G06F 11/34* (2006.01)
*G06F 40/221* (2020.01)

(52) U.S. Cl.
CPC ........ *G06F 11/3476* (2013.01); *G06F 40/221* (2020.01)

(58) Field of Classification Search
CPC ............................ G06F 11/3476; G06F 40/221
USPC ........................................................ 709/224
See application file for complete search history.

(56) References Cited

U.S. PATENT DOCUMENTS

| | | | |
|---|---|---|---|
| 2019/0258677 A1* | 8/2019 | Beedgen | G06F 11/3476 |
| 2022/0269417 A1* | 8/2022 | Sanvido | G06F 3/0608 |

* cited by examiner

*Primary Examiner* — Alan S Chou
(74) *Attorney, Agent, or Firm* — Lowenstein Sandler LLP

(57) ABSTRACT

Systems and methods include identifying fields associated with a log event of telemetry data and, for each field, selecting a key from multiple keys and generating a field-key mapping that includes a mapping from the fields to the selected key. The systems and methods generate an event log parser extension that includes the field-key mappings and validate the parser extension by testing its performance on sample log events. The systems and methods then execute a base parser and the validated event log parser extension on event logs to convert the event logs into a standardized format and perform data analytics on the standardized event logs to identify trends in the event logs and identify possible threats.

11 Claims, 13 Drawing Sheets

300

---

310
Identify one or more fields associated with an event log

320
For a first field in the one or more fields, select a key from a plurality of keys and generate a field-key mapping

330
Generate an event log parser that includes one or more field-key mappings

```
{
    "metadata": {
434-1 → "event_timestamp": "2020-04-28T07:40:48.129Z",
462-1 → "event_type": "NETWORK_HTTP",
462-2 → "product_name": "Acme Web Proxy",
462-3 → "vendor_name": "Acme"
    },
    "principal": {
434-2 → "ip": "192.168.23.4"
    },
    "target": {
434-6 → "url": "www.sample.com/images/logo.png",
434-7 → "ip": "203.0.113.52"
    },
    "network": {
        "http": {
434-5 →     "method": "GET",
434-3 →     "response_code": 200,
434-4 →     "received_bytes": 904
        }
    },
}
```

610
Identify one or more fields associated with a first event log of a plurality of event logs

620
For a first field in the one or more fields, select a key from a plurality of keys and generate a field-key mapping

630
Generate an event log parser extension that includes one or more field-key mappings

640
Execute the event log parser extension

```
{
        "metadata": {
434-1 →   "event_timestamp": "2020-04-28T07:40:48.129Z",
462-1 →   "event_type": "NETWORK_HTTP",
462-2 →   "product_name": "Acme Proxy",
462-3 →   "vendor_name": "Acme"
        },
        "principal": {
434-2 →   "ip": "192.168.23.4"
        },
        "target": {
434-6 →   "url": "www.sample.com/images/logo.png",
434-7 →   "ip": "203.0.113.52"
        },
        "network": {
            "http": {
434-5 →       "method": "GET",
434-3 →       "response_code": 200,
434-4 →       "received_bytes": 904
            }
        },
        "security": {
704-1 →   "repeats": 36,
704-2 →   "previous_timestamp": 2020-04-28T07:40:44.261Z
        }
}
```

FIG. 8

AUGMENTING PARSERS BY ADDED PARSER STAGES

TECHNICAL FIELD

The instant specification generally relates to computing devices. More specifically, the instant specification relates to augmenting parsers by added parser stages.

BACKGROUND

Computing devices—including servers, storage devices, or network devices—and software applications generate event logs in response to certain actions that occur on the computing devices or in the applications. The actions can include an operating system event, an error generated by a software application, or other actions that can occur on a computing device or in an application. An event log often takes the form of a field-value pair where the field can include text that indicates what the corresponding value means. Data analytics platforms can analyze these event logs to determine a variety of phenomena that can occur on the computing devices or in the software applications, including identifying trends regarding use of the computing devices or identifying malicious activity such as a cyberattack.

SUMMARY

Disclosed herein are systems and methods for augmenting parsers by added parser stages. Computing devices, other devices, and software may generate event logs that represent events that occur on the devices or software. Event logs can come in a variety of formats. A parser may convert an event log to a standardized format so an event log analytics subsystem can perform data analysis operations or other types of operations on the event logs. However, the parser may not capture all of the data from an event log as desired by a user. The user can generate an event log parser extension that may augment the functionality of the parser. The user may configure the parser extension to map certain fields in the event log to keys in the standardized format and insert those keys into a data object in the standardized format. An event log analytics subsystem can perform data analysis on the data objects to identify trends in the event logs and gain other insights into the data of the event logs, including data captured by the parser extension.

One aspect of the disclosure includes a method. The method may include identifying one or more fields associated with a first event log of a first plurality of event logs of first telemetry log data. The method may include, for a first field in the one or more fields, selecting a key from a plurality of keys and generating an event log parser extension that includes the one or more field-key mappings. The key may represent a data field in a predefined format. The method may include executing the validated event log parser extension on at least a subset of a second plurality of event logs of second telemetry log data.

Another aspect of the disclosure includes a system that includes a memory and one or more processing devices coupled to the memory. The one or more processing devices may be configured to perform operations. The operations may include obtaining telemetry log data that includes an event log generated by a computing device. The event log may include a plurality of values. The operations may further include parsing, using an event log parser, a first portion of the plurality of values to generate a data object that includes a plurality of first key-value pairs, each including a first portion value from the first portion of the plurality of values and a key assigned to the first portion value. The operations may further include parsing, using an event log parser extension, a second portion of the plurality of values to insert one or more second key-value pairs into the data object. Each of the one or more second key-value pairs may include a second portion value from the second portion of the plurality of values and a key assigned to the second portion value. The operations may further include performing one or more data analysis operations on the data object.

Another aspect of the disclosure may include a non-transitory computer-readable storage medium that includes instructions stored thereon that, when executed by at least one processing device, are configured to cause a computing system to carry out instructions. The instructions may include obtaining telemetry log data that include an event log generated by a computing device. The event log may include a plurality of values. The instructions may further include parsing, using an event log parser, a first portion of the plurality of values to generate a data object that includes a plurality of key-value pairs each including a first value from the first portion of the plurality of values and a key assigned to the first value. The instructions may further include parsing, using an event log parser extension, a second portion of the plurality of values to insert the second portion of the plurality of values into the data object. The instructions may include performing one or more data analysis operations on the data object.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3 depicts a flowchart illustrating an example method for practicing selected aspects of the present disclosure, in accordance with various embodiments.

FIG. 4C schematically illustrates an example data object in which selected aspects of the present disclosure may be implemented, in accordance with various embodiments.

FIG. 6 depicts a flowchart illustrating an example method for practicing selected aspects of the present disclosure, in accordance with various embodiments.

FIG. 8 schematically illustrates another example data object in which selected aspects of the present disclosure may be implemented, in accordance with various embodiments.

DETAILED DESCRIPTION

Figure 1:
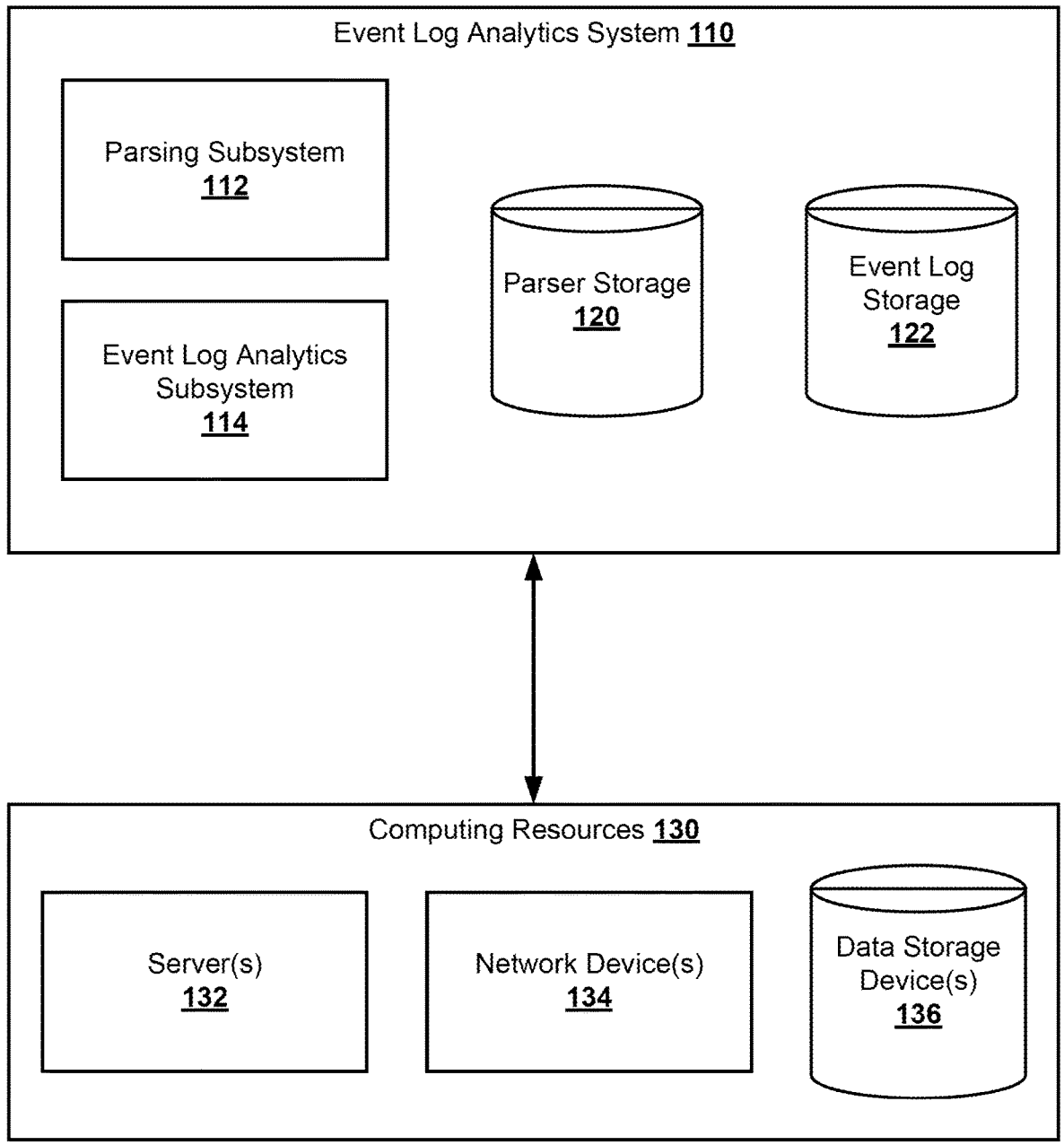
FIG. 1 schematically illustrates an example system for augmenting parsers by added parser stages in which selected aspects of the present disclosure may be implemented, in accordance with various embodiments.

Computing networks-which can include computing devices, network devices, other types of devices, and software applications-generate event logs in response to certain actions that occur in the network. The actions can include an operating system event, an error generated by a software application, or other actions that can occur in the network. Data analytics platforms can analyze these event logs to determine a variety of phenomena that can occur in the computing network, such as identifying trends regarding use of the computing devices in the network or identifying malicious activity such as a cyberattack on the network.

Event logs can come in many formats and take a variety of forms, depending on the vendor of the device that generated the event log, the model of the device, the vendor of the software application, the version of the application, or the type of event represented by the event log. In some cases, two different devices or applications that perform similar functionality can generate event logs in very different formats for the same or similar events. In order for a data analytics platform to intelligently analyze event logs, the data analytics platform may convert event logs into a standardized schema.

The data analytics platform may use event log parsers (sometimes referred to, herein, simply as "parsers") to convert event logs to the standardized schema. A parser may include a piece of software configured to accept an event log as input and convert the event log into a data object that complies with the standardized schema. However, with the large number of devices and software applications available, it is difficult for the operator of the data analytics platform to both create new event log parsers and maintain already-existing event log parsers. Thus, a data analytics platform's parsers may not be able to handle the desired event logs, which can lead to the data analytics platform being unable to provide data analysis insights to some event logs, which may lead to computational inefficiencies by the devices generating the event logs. In some cases, the data analytics platform may be unable to recognize malicious activity such as security breaches or cyberattacks on devices that generate some event logs, exposing these devices to downtime or malware.

Aspects and implementations of the present disclosure address the above deficiencies, among others, by providing an event log analytics system capable of generating event log parser extensions (sometimes referred to, herein, simply as "parser extensions"). A parser extension is configured to augment an existing parser by converting portions of an event log that are unrecognized by the existing parser into a standardized format. The event log analytics system can then analyze the converted event log information to identify trends in the event logs, identify malicious activity such as security breaches or cyberattacks, and provide other network enhancements.

In addition, some benefits of the present disclosure may provide a technical effect caused by or resulting from a technical solution to a technical problem. For example, one technical problem may relate to the inability of a data analytics platform to analyze event logs from certain devices because the devices are new or have been modified and, thus, existing parsers cannot recognize certain data in the event logs and, thus, do not capture such data. One of the technical solutions to the technical problem may include generating and using a parser extension to augment the functionality of the existing parsers and capture the unrecognized event log data. As a consequence, the inability of a data analytics platform to capture important data in the event logs is reduced or eliminated.

Another technical problem may relate to the improper configuration of certain devices in a computing network. The improper configuration may result in inefficient usage of computing resources (including processing device usage, memory usage, storage usage, or network traffic). One of the technical solutions to the technical problem may include using parsers and parser extensions of the event log analytics system to convert event logs from the devices in the computing network into a standardized format. The event log analytics system can then analyze the standardized event log data to identify alternative configurations that are more efficient. As a consequence, computing resources used by the computing network are reduced and computing resource usage is more efficient.

Another technical problem may relate to the improper configuration of the computing network resulting in the network being exposed to cyberattacks. One of the technical solutions to the technical problem may include using parsers and parser extensions of the event log analytics system to convert event logs from the devices in the computing network into a standardized format. The event log analytics system can then analyze the standardized event log data to identify cyberattack attempts. As a consequence, the operator of the computer network can take actions to prevent the cyberattacks or reduce their impact on the network, and effects of cyberattacks on the network are reduced or eliminated.

FIG. 1 is a schematic block diagram illustrating an example system 100 for augmenting parsers by added parser stages in which selected aspects of the present disclosure may be implemented, in accordance with various embodiments. The system 100 may include an event log analytics system 110. The event log analytics system 110 may include a parsing subsystem 112, an event log analytics subsystem 114, a parser storage 120, or a standardized event log storage 122. The system 100 may include computing resources 130. The computing resources 130 may include one or more servers 132, one or more network devices 134, or one or more data storage devices 136. The event log analytics system 110 and the computing resources 130 may be in data communication with each other over a data network.

In some implementations, the event log analytics system 110 may include a computing network. A computing network may include one or more computing devices in data communication with each other over a data network. The data network may include a local area network (LAN), wide area network (WAN), a virtual private network (VPN), or some other data network. The data network may include network devices, including switches, routers, hubs, gateways, wireless access points, bridges, modems, repeaters, or other network devices.

In some cases, the event log analytics system 110 may include a cloud computing system. In some implementations, a cloud computing system may include one or more computing devices (or portions of cloud computing devices) provided to an end user by a cloud provider. An end user of the environment may utilize a portion of the cloud computing system to host content for use or access by other parties or perform other computational tasks. In some implementations, the cloud computing system may be configured to allow the end user to use a portion of a computing device (e.g., only certain hardware, software, or other computer system resources). The cloud computing environment may include a private cloud, a public cloud, or a hybrid cloud. The cloud computing environment may provide infrastructure-as-a-service (IaaS), platform-as-a-service (PaaS), or software-as-a-service (SaaS) computing. The cloud computing environment may provide serverless computing. The event log analytics system 110 may be configured to receive event log data from the computing resources 130, use parsers and parser extensions to convert the event log data into a standardized format and perform data analytics operations on the event log data in the standardized format.

The event log analytics system 110 may include one or more computing devices. In some implementations, a computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In one implementation, the parsing subsystem 112 may include one or more software applications configured to generate parsers and parser extensions, edit and manage parsers and parser extensions, validate parsers and parser extensions, and execute parsers and parser extensions. A user of the computing resources 130 may use a user interface on a computing device that is in data communication with the parsing subsystem 112 to create a new parser or parser extension. The parsing subsystem 112 may then receive event log data compatible with the parser or parser extension and may execute the parser or parser extension to convert the event log data into a standardized format and store the converted event log data.

The event log analytics subsystem 114 may include one or more software applications configured to perform data analytics operations and other operations on the converted event log data to identify trends in the data, determine improved configurations for devices in the computing resources 130 that provide event log data, and perform other operations on the converted event log data. A user of the computing resources 130 may use a user interface of a computing device in data communication with the event log analytics subsystem 114 to view the results of the data analytics and other operations.

The parser storage 120 may include a data store configured to store one or more parsers and one or more parser extensions. A data store may include a physical storage medium that can include volatile storage (e.g., random access memory (RAM), etc.) or non-volatile storage (e.g., a hard disk drive (HDD), flash memory, etc.). A data store can include a file system, a database, or some other software configured to store data.

A parser can include data, code, a software application, or other data configured to be executed by the parsing subsystem 112. A parser may be configured to accept an event log as input and convert at least a portion of the event log into a standardized format. The parser may be configured to perform other event log processing-related functionality.

A parser extension can include data, code, a software application, or other data configured to be executed by the parsing subsystem 112. A parser extension may be configured to augment the functionality of a parser or augment the data that a parser can process when executing on an event log. The parser extension may be configured to accept an event log as input and convert at least a portion of the event log into a standardized format. The parser extension may be configured to perform other event log processing-related functionality.

The event log storage 122 may include a data store configured to store event log data. The stored event log data may include event logs prior to being processed by the parsing subsystem 112 (sometimes referred to, herein, as "raw event logs") or may include event logs in a standardized format (i.e., after being processed by the parsing subsystem 112). The event log storage 122 may provide raw event logs to the parsing subsystem 112, the parsing subsystem 112 may convert the raw event logs to a standardized format and store the standardized event log data in the event log storage 122. The event log storage 122 may provide standardized event log data to the event log analytics subsystem 114 for analysis.

In one or more implementations, the computing resources 130 may include a computing network. The computing resources 130 may include a computing network operated by a customer of the entity that operates the event log analytics system 110 and provides event log analytics services to the customer. The computing resources 130 may include one or more servers 132. A server 132 may include a computing device, including a physical computing device or a VM. The computing resources 130 may include one or more network devices 134. A network device 134 may include a switch, router, hub, gateway, wireless access point, bridge, modem, repeater, or other network devices. A network device 134 may help provide data communication between the one or more servers 132, between other devices of the computing resources 130, or between a computing device external to the computing resources 130 and a device of the computing resources 130. The computing resources 130 may include one or more data storage devices 136. A data storage device 136 may include a data store. One or more servers 132 or other computing devices of the computing resources 130 may store data in the one or more data storage devices 136 or retrieve data from the one or more data storage devices 136.

Figure 2A:
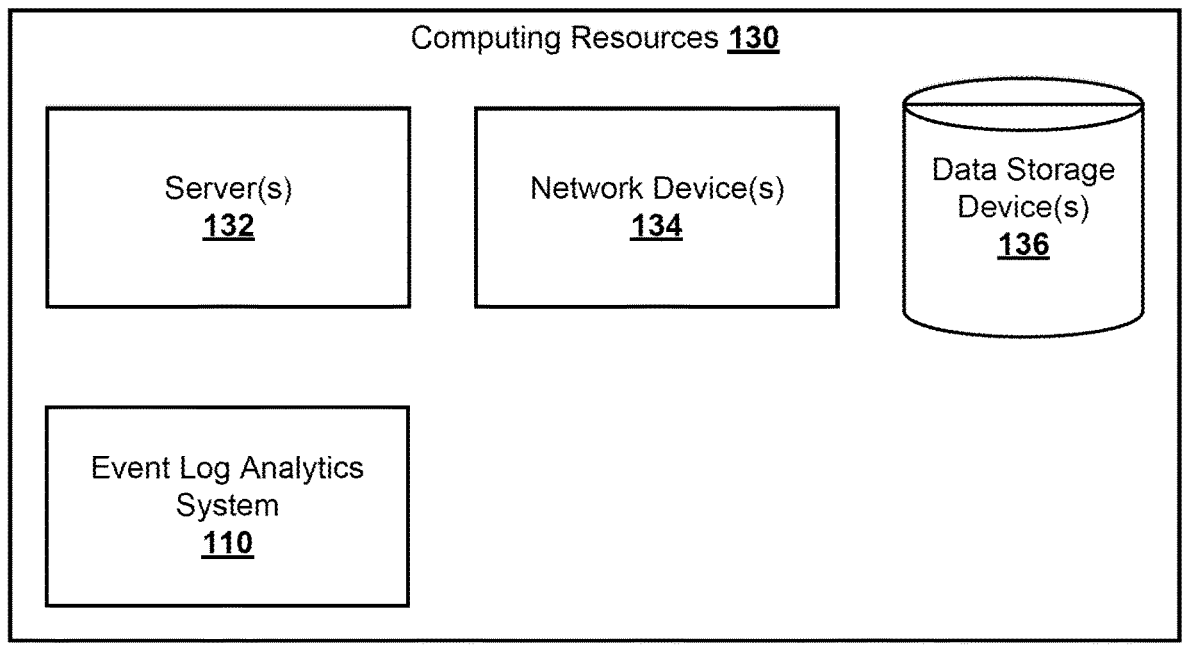
FIG. 2A schematically illustrates another example system for augmenting parsers by added parser stages in which selected aspects of the present disclosure may be implemented, in accordance with various embodiments.
Figure 2B:
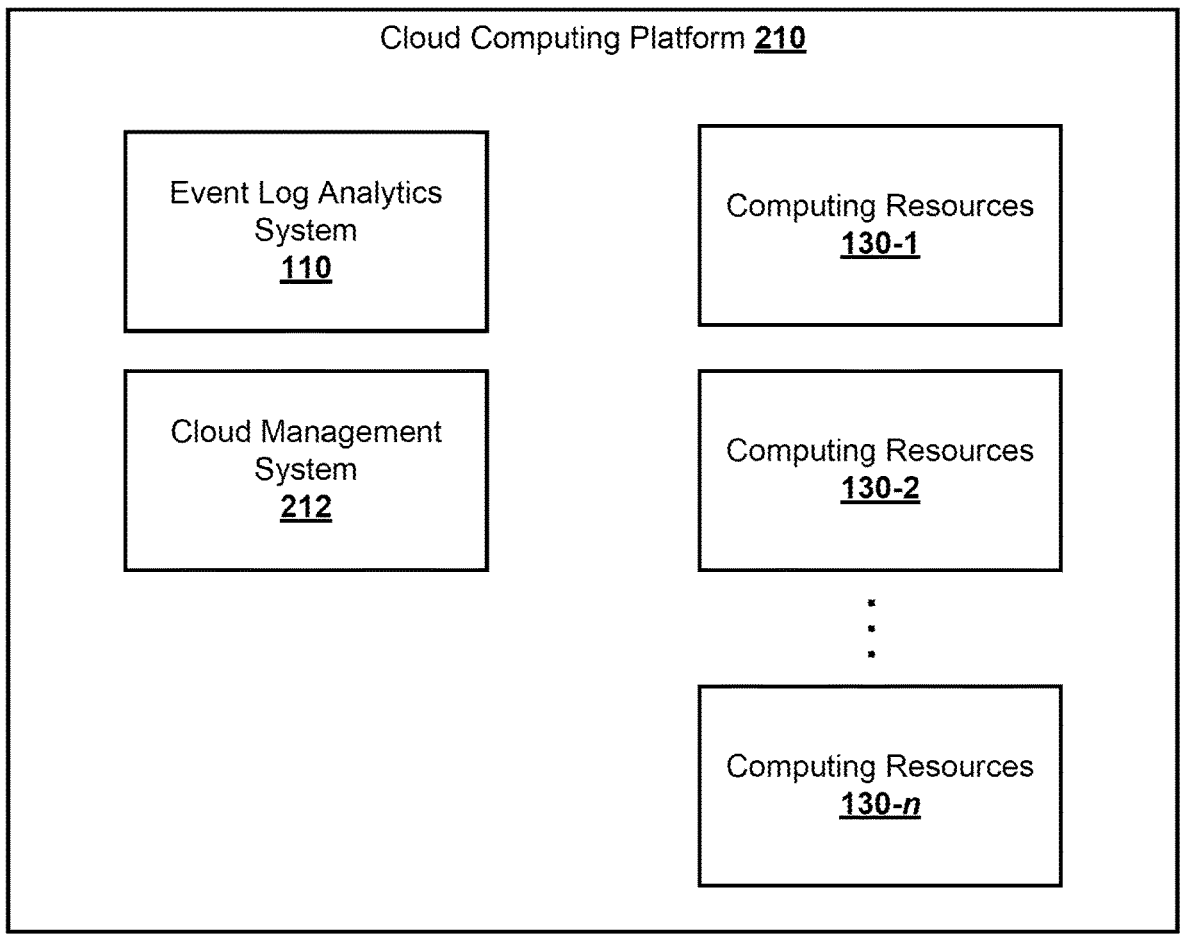
FIG. 2B schematically illustrates another example system for augmenting parsers by added parser stages in which selected aspects of the present disclosure may be implemented, in accordance with various embodiments.

In some implementations, the event log analytics system 110 and the computing resources 130 may be separate computing networks and may communicate with each other over a data network. However, as seen in the example system 200 of FIG. 2A, in certain implementations, the computing resources 130 may include the event log analytics system 110. For example, the components of the event log analytics system 110 may be installed on one or more computing devices of the computing resources 130. The event log analytics system 110 may provide its functions locally to the computing resources 130. As seen in the example system 250 of FIG. 2B, in one or more implementations, a cloud computing platform 210 may include the event log analytics system 110 and one or more sets of computing resources 130-1, . . . , 130-n. The sets of computing resources 130-1, . . . , 130-n may be cloud computing environments provided by the cloud provider of the cloud computing platform 210, and the cloud provider may operate the event log analytics system 110 and allow the sets of computing resources 130-1, . . . , 130-n to use the event log analytics system's 110 functionality. The cloud computing platform 210 may include a cloud management system 212, which may include one or more computing devices or software configured to manage the cloud computing platform 210, including provisioning the one or more sets of computing resources 130-1, . . . , 130-n to users or coordinate usage of the event log analytics system 110 by the sets of computing resources 130-1, . . . , 130-n.

FIG. 3 is a flowchart illustrating one embodiment of a method 300 for generating an event log parser, in accordance with some implementations of the present disclosure. A processing device, having one or more central processing units (CPUs) and/or memory devices communicatively coupled to the CPU(s) and/or graphics processing units (GPU(s)) can perform the method 300 and/or each of their individual functions, routines, subroutines, or operations. In certain implementations, a single processing thread can perform the method 300. Alternatively, two or more processing threads can perform the method 300, each thread executing one or more individual functions, routines, subroutines, or operations of the method. In an illustrative example, the processing threads implementing the method 300 can be synchronized (e.g., using semaphores, critical sections, and/or other thread synchronization mechanisms). Alternatively, the processing threads implementing the method 300 can be executed asynchronously with respect to each other. Various operations of the method 300 can be performed in a different (e.g., reversed) order compared with the order shown in FIG. 3. Some operations of the method 300 can be performed concurrently with other operations. Some operations can be optional. In some embodiments, the parsing subsystem 112 or the event log analytics subsystem 114 may perform the method 300.

Block 310 may include identifying one or more fields associated with an event log of telemetry log data. In one implementation, the parsing subsystem 112 may perform block 310. The telemetry data may include one or more event logs. The one or more event logs may include raw event logs, i.e., event logs that have not yet been converted to a standardized format by the parsing subsystem 112. The telemetry log data may include telemetry log data provided to the event log analytics system 110 by the computing resources 130. The event log storage 122 may store the telemetry log data. The telemetry log data may include security telemetry log data, which may include one or more event logs that provide information about a security-related event of a computing device.

In some implementations, an event log may include a data record that represents an event related to a device or software of the computing resources 130. A device (including a component of the device) may generate the event log, or software may generate the event log. The event log may include data about the event represented by the event log. In some embodiments, an event log may include an event type. The event type may be indicated in the event log itself or may be indicated by metadata associated with the event log.

Figure 4A:
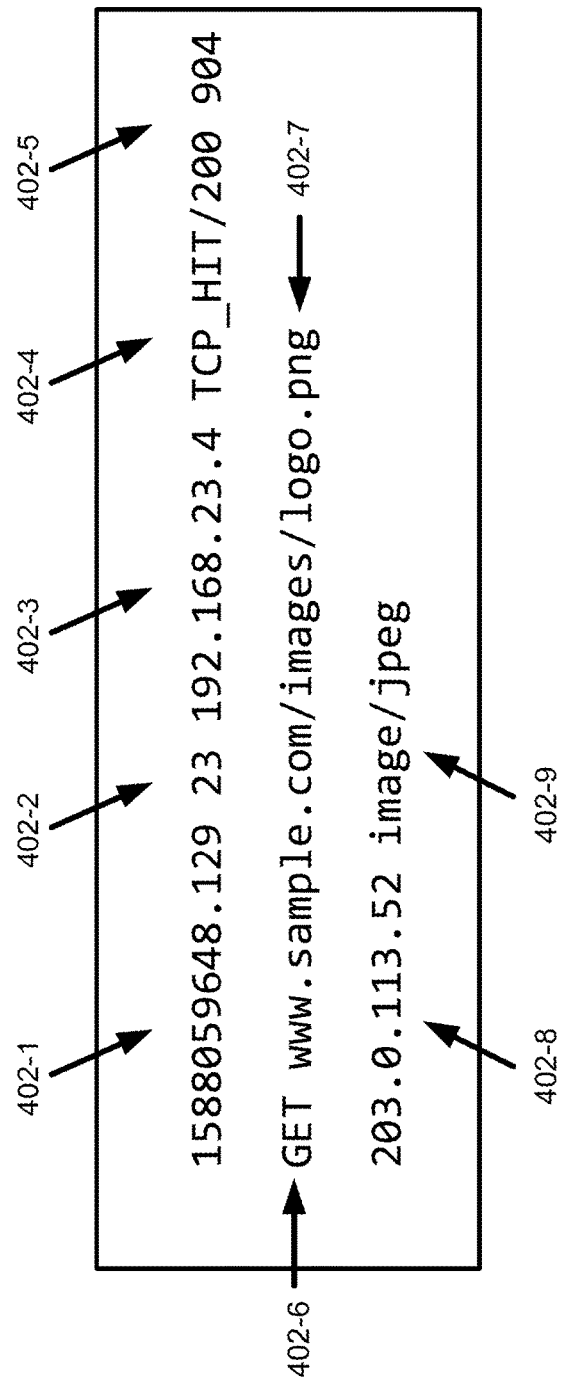
FIG. 4A schematically illustrates an example event log in which selected aspects of the present disclosure may be implemented, in accordance with various embodiments.

FIG. 4A depicts an example event log 400. The event log 400 may include a web proxy-type event log. The example event log 400 may represent the event of a computing device requesting a web resource on a server 132. The event log 400 includes one or more fields 402-1, . . . , 402-9. The fields 402-1, . . . , 402-9 include values that provide information about the event represented by the event log 400. For example, as depicted in FIG. 4A, value 402-1 may include a timestamp of when the event occurred or when the event log 400 was generated. The value 402-2 may include a duration of the event (e.g., in the example event log 400, the duration 402-2 may be provided in milliseconds). The value 402-3 may include a client Internet Protocol (IP) address (e.g., the IP address of the device that initiated the event). The value 402-4 may include a result code (e.g., in the example event log 400, a TCP_HIT result code and an HTTP 200 code). The value 402-5 may include a length of the received request for the web resource (e.g., in bytes). The value 402-6 may include a request method (e.g., in the example event log 400, an HTTP GET request). The value 402-7 may include a uniform resource locator (URL) (e.g., in the example event log 400, the URL of the requested web resource). The value 402-8 may include a target IP address (e.g., the IP address of the device that hosts the requested web resource). The value 402-9 may include a content type (e.g., in the example, event log 400, the type of the content requested). Each of the values 402-1, . . . , 402-9 may include a field associated with the event log 400.

In some implementations, an event log 400 may include one or more field names. A field name may include data indicating the name of a field. For example, an event log 400 in a Javascript Object Notation (JSON) or Extensible Markup Language (XML) format may include a field name associated with a value. In some implementations, an event log 400 may not include field names. For example, the event log 400 of FIG. 4A does not include field names.

In one implementation, the parsing subsystem 112 may identify the one or more fields 402 associated with an event log 400. Identifying the one or more fields 402 may include delimiting the fields using a delimiter. For example, in the example event log 400 of FIG. 4A, the delimiter separating the fields 402-1, . . . , 402-9 is the space character. Identifying the one or more fields 402 may include traversing a structure of the event log 400 (e.g., where the event log 400 includes a JSON object, XML data, or comma-separated values (CSV) data) and parsing the structure into different pieces of data.

Block 320 may include, for a first field 402 in the one or more fields 402, selecting a key from one or more keys and generating a field-key mapping. A key may represent a data field in a predefined format. The field-key mapping may include a mapping from the field 402 to the selected key. The predefined format may include a standardized format used by the event log analytics subsystem 114. As discussed above, the event log analytics subsystem 114 may use event logs in a standardized format, but different devices may provider raw event log data that is not in the standardized format. Thus, the parsing subsystem 112 may use parsers and parser extensions to convert the raw event log data into the standardized format. Part of that parsing may include mapping a field in a raw event log to a key in the standardized format.

In one implementation, the event log analytics system 110 may include multiple keys. The keys may include standardized data fields recognized by the event log analytics subsystem 114. The parsing subsystem 112 may select a key from the multiple keys and generate a field-key mapping that maps a field of a raw event log (e.g., the first field of block 320) to the selected key.

Figure 4B:
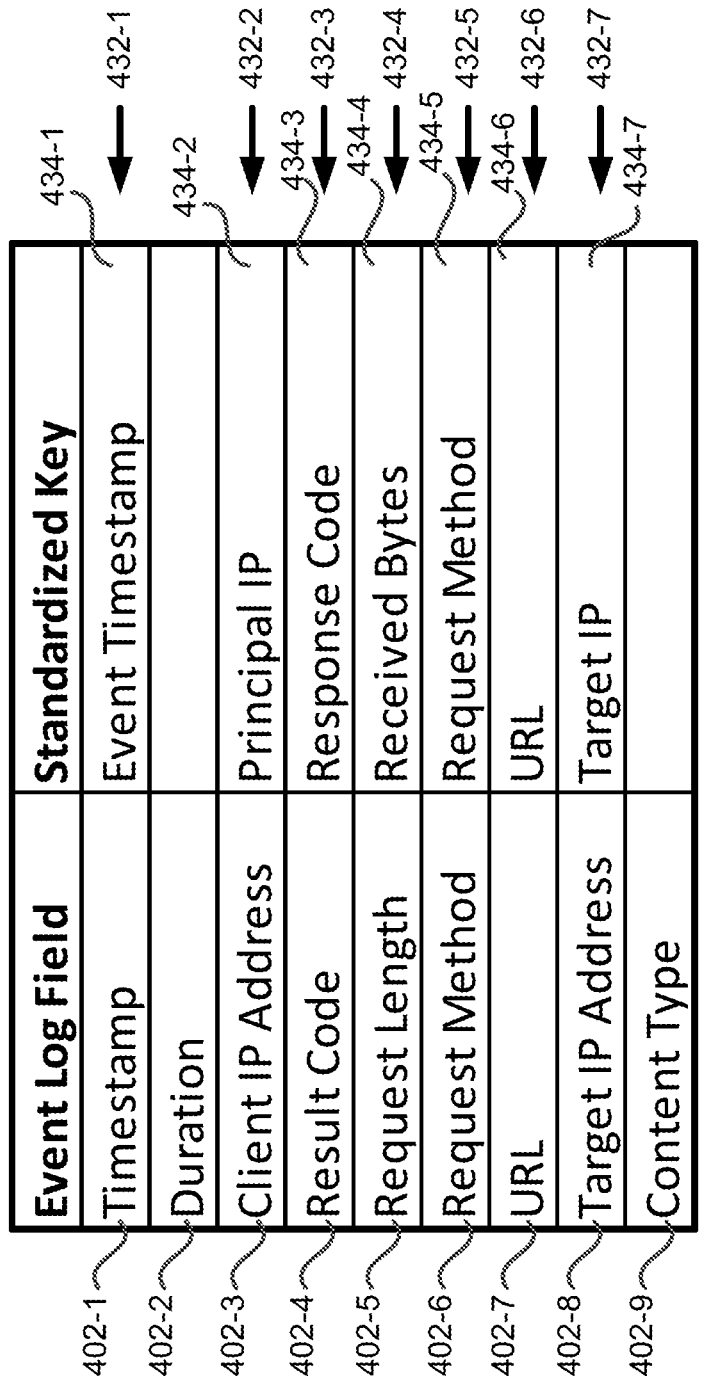
FIG. 4B schematically illustrates an example set of field-key mappings in which selected aspects of the present disclosure may be implemented, in accordance with various embodiments.

FIG. 4B depicts an example set 430 of field-key mappings 432-1, . . . , 432-7 for the event log 400 of FIG. 4A. The set 430 of field-key mappings 432-1, . . . , 432-7 may include one or more field-key mappings 432 that indicate which fields 402 of the raw event log 400 map to which key 434 of the standardized format. For example, the timestamp field 402-1 maps to the event timestamp key 434-1, the client IP address field 402-3 maps to the principal IP key 434-2, the result code field 402-4 maps to the response code key 434-3, the request length field 402-5 maps to the received bytes key 434-4 key, the request method field 402-6 maps to the request method key 434-5, the URL field 402-7 maps to the URL key 434-6, and the target IP address field 402-8 maps to the target IP key 434-7.

As can be seen from the example set 430 of field-key mappings 432-1, . . . , 432-7 of FIG. 4B, in some implementations, certain fields 402 in an event log 400 may not map to a key 434. For example, the duration field 402-2 and the content type field 402-9 may not map to corresponding keys 434. This may result from the event log analytics subsystem 114 not needing the data stored in these fields 402. As can also be seen from the example set 430 of field-key mappings 432, in one or more implementations, a field 402 may include the same field name as the key 434 (e.g., the request method field 402-6 and the request method key 434-5) or a field 402 may include a different field name from the corresponding key 434 (e.g., the timestamp field 402-1 and the event timestamp key 434-1).

In some implementations, the method 300 may repeat block 320 for one or more other fields 402 in the one or more fields 402 of the event log 400. For each performance of the block 320, the method may include selecting a key 434 and generating a field-key mapping 432 from the field 402 to the selected key 434. The method 300 may perform the block 320 for all fields 402 in an event log 400 or may perform the block 320 for a subset of the fields 402 of the event log 400.

Block 330 may include generating an event log parser that includes the set 430 of the one or more field-key mappings 432-1, . . . , 432-7. The parser may include data or software that may execute on an event log to convert a raw event log to the standardized format according to the set 430 of field-key mappings 432-1, . . . , 432-7.

In some implementations, the parser may include additional functionality to mapping event log 400 fields 402 to keys 434. For example, in one implementation, the parser may normalize the value of a key 434. In certain implementations, the parser may convert a field 402 into a different data format and include the differently formatted data as the key 434. For example, the raw event law may include a timestamp in the Unix epoch timestamp format (e.g., 1588059648.129), and the standardized format may include a timestamp in the format [YEAR]-[MONTH]-[DAY] T [HOUR]:[MINUTE]:[SECOND] Z (e.g., 2020-04-28T07: 40:48.129Z) where T indicates that the data following the "T" is the clock time and Z indicates that the timestamp is offset from Coordinated Universal Time (UTC) by 0. In another example, the parser may convert a float to an integer. In certain implementations, the parser may automatically include certain data in the standardized format. For example, the parser may include keys including data indicating the event type of the event log 400, the device that generated the event log 400 (e.g., the device's product name, the device's model identifier, the device's manufacturer or vendor, etc.), the software that generated the event log 400 (e.g., the software's name, the software's version, the software's developer or vendor, etc.), or other keys.

FIG. 4C depicts a data object 460 that represents the event log 400 converted into the standardized format according to the set 430 of field-key mappings 432-1, . . . , 432-7. The data object 460 may be in the JSON format. The data object 460 may include the one or more keys 434-1, . . . , 434-7 of the set 430 of field-key mappings 432-1, . . . , 432-7. The data object 460 may include additional keys 462-1, . . . , 462-3. For example, the data object 460 may include an event type key 462-1 (which may include data indicating the event type represented by the event log 400), a product name key 462-2 (which may include data indicating the device or software that generated the event log 400), and a vendor name key 462-3 (which may include data indicating the device's or software's vendor that generated the event log 400).

By performing the method 300, the parsing subsystem 112 may generate an event log parser configured to convert raw event logs into a standardized format. However, after the parser has been generated, the device or software that generates the event log 400 may change (e.g., due to an update in firmware, software, or due to some other change). The change may result in a change to the event logs generated by the device or software, which may result in the parser no longer functioning properly or the parser not converting certain fields 402 to the standardized format.

Figure 5:
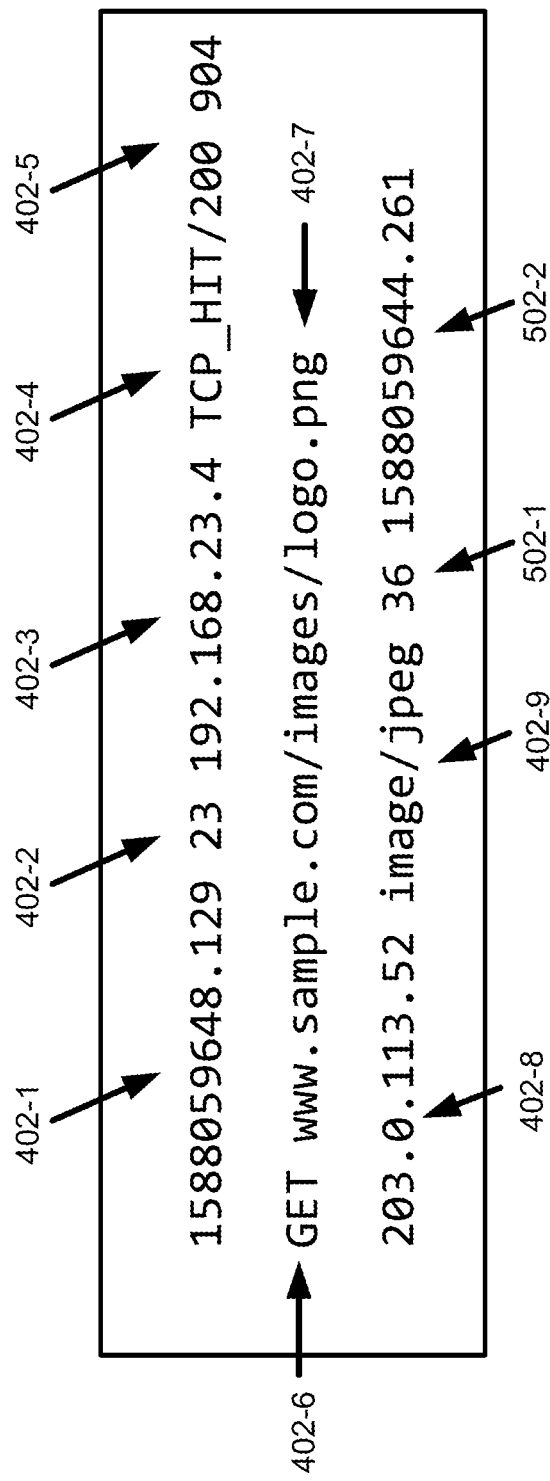
FIG. 5 schematically illustrates another example event log in which selected aspects of the present disclosure may be implemented, in accordance with various embodiments.

FIG. 5 depicts an example event log 500. The event log 500 may be similar to the event log 400 of FIG. 4A. For example, as can be seen in FIG. 5, the event log 500 may include at least some of the fields 402-1, . . . , 402-9 of the event log 400. However, the event log 500 may include additional fields 502-1, 502-2. The additional fields 502-1, 502-2 may result from the device or software that generates the event log 400 changing, which may result in the device or software generating the event log 500 instead. For example, as can be seen in FIG. 5, the event log 500 may include a "repeats" field 502-1, which may include a number of times the same client IP address 402-3 has repeatedly requested the same web resource indicated by the URL 402-7. The event log 500 may include a last timestamp field 502-2, which may include the timestamp of the last time the client IP address 402-3 requested the web resource. The data contained in these fields 502-1, 502-2 may assist the event log analytics subsystem 114 in identifying a denial-of-service attack on the device that generated the event log 500.

A user of the computing resources 130 may desire to use the event log analytics subsystem 114 to analyze the new event logs 500, including the additional fields 502-1, 502-2. The parser may still be able to accept the new event log 500 as input and convert at least a portion of the fields 402-1, . . . , 402-9 of the event log 500 to the standardized format. However, the parser may not be configured to convert the additional fields 502-1, 502-2 to the standardized format. In such cases, an event log parser extension may augment the parser and assist the parser in converting those additional fields 502-1, 502-2 to the standardized format. The parsing subsystem 112 may associate the parser extension with the parser that is being augmented (which may sometimes be referred to, herein, as the "base parser"). Associating the parser extension with the base parser may include generating a logical link in the parser storage 120 from the base parser to the parser extension or vice versa. In some cases, the parser extension may be associated with an event type (which may include an event type that the base parser may accept as input).

FIG. 6 is a flowchart illustrating one embodiment of a method 600 for augmenting parsers by added parser stages, in accordance with some implementations of the present disclosure. A processing device, having one or more CPUs, memory devices communicatively coupled to the CPU(s), and/or GPU(s) can perform the method 600 and/or each of their individual functions, routines, subroutines, or operations. In certain implementations, a single processing thread can perform the method 600. Alternatively, two or more processing threads can perform the method 600, each thread executing one or more individual functions, routines, subroutines, or operations of the methods. In an illustrative example, the processing threads implementing the method 600 can be synchronized (e.g., using semaphores, critical sections, and/or other thread synchronization mechanisms). Alternatively, the processing threads implementing the method 600 can be executed asynchronously with respect to each other. Various operations of the method 600 can be performed in a different (e.g., reversed) order compared with the order shown in FIG. 6. Some operations of the method 600 can be performed concurrently with other operations. Some operations can be optional. In some embodiments, the parsing subsystem 112 or the event log analytics subsystem 114 may perform the method 600.

Block 610 may include identifying one or more fields 502 associated with a first event log 500 of multiple event logs 500 of first telemetry log data. The multiple event logs 500 of the first telemetry data (including the first event log 500) may include raw event logs. The multiple event logs 500 may include event logs of the same event type. The event logs 500 may include event logs 500 in a new configuration from a previous event log 400 of the same type. The first telemetry log data may include telemetry log data provided to the event log analytics system 110 by the computing resources 130.

In one implementation, the one or more fields 502-1, 502-2 may include a field 502 unrecognized by the base parser. A field 502 unrecognized by the base parser may include a field 502 that the base parser does not map to a key 434. For example, the set 430 of field-key mappings 432 of the base parser may not include a mapping from the field 502 to a key 434. In one implementation, the one or more fields 502-1, 502-2 may include a field 502 that a user of the computing resources 130 may desire to operate on differently than how the field 502 was operated on with the base parser. For example, the base parser may simply map a field's 402 corresponding value to a certain key 434, but the user may desire for the parser extension to map the value to a different key 434. In some implementations, the parsing subsystem 112 may identify the one or more fields 502-1, 502-2 associated with the first event log 500. Identifying the one or more fields 502-1, 502-2 may include delimiting the fields using a delimiter. Identifying the one or more fields 502-1, 502-2 may include determining whether the field is not included in the set 430 of field-key mappings 432 of the base parser.

Figure 7:
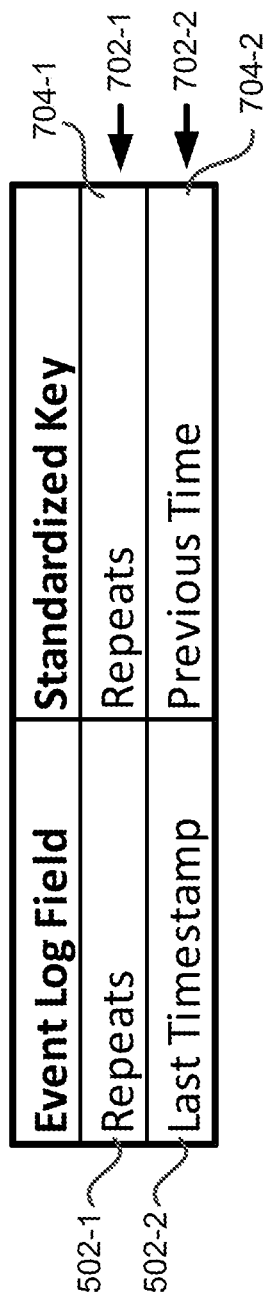
FIG. 7 schematically illustrates another example set of field-key mappings in which selected aspects of the present disclosure may be implemented, in accordance with various embodiments.

Block 620 may include, for a first field 502 in the one or more fields 502-1, 502-2, selecting a key from one or more keys and generating a field-key mapping comprising a mapping from the field 502 to the selected key. The key may represent a data field in a predefined format. FIG. 7 depicts an example set 700 of one or more field-key mappings 702-1, 702-2. Similar to the set 430 of field-key mappings 432-1, . . . , 432-7 of FIG. 4B, each field-key mapping 702 maps a field 502 to a corresponding key 704. In one implementation, the multiple keys 704 may include standardized data fields recognized by the event log analytics subsystem 114. The multiple keys 704 may be included in a set of multiple keys that include the keys 434. The parsing subsystem 112 may select a key 704 from the multiple keys 704 and generate a field-key mapping 702 that maps a field 502 of a raw event log 500 to the selected key 704.

In one implementation, selecting a key 704 from the one or more keys 704 may include the parsing subsystem 112 obtaining parser extension source code. The parser extension source code may include source code received from a user interface on a computing device of the computing resources 130. A user of the computing resources 130 may have written the source and submitted the source code to the parsing subsystem 112 to be used in generating a parser extension. Generating the field-key mapping 702 may be based on the parser extension source code. The parsing subsystem 112, or some other component of the event log analytics system 110, may compile the parser extension source code into a set of instructions in a programming language executable by a computing device executing the parsing subsystem 112.

In some implementations, selecting the key 704 from the one or more keys 704 may include the parsing subsystem 112 obtaining a user selection of the selected key 704. The parsing subsystem 112 may present, using a user interface, a list of possible keys 704 to the user generating the parser extension. The list of possible keys 704 may include one or more keys 704 stored by the parsing subsystem 112 (e.g., in the parser storage 120) that may be in a standardized format compatible with the event log analytics subsystem 114. In some implementations, the parsing subsystem 112 may calculate a relevancy of a key 704 and may sort the list of possible keys 704 by relevancy. Calculating the relevancy may be based on the data type or format of the data of the field 502 (e.g., a timestamp, an integer, a float, an IP address, a text string, a URL, etc.), a field name of the field 502, the similarity of the field 502 to fields in the set 430 or 700 of field-key mappings 432 or 702 of other parsers or parser extensions, or other relevancy-determining configurations. The parsing subsystem 112 may then convert the set 430 of field-key mappings 702-1, 702-2 into a set of instructions in a programming language executable by a computing device executing the parsing subsystem 112. The method 600 may include repeating block 620 for one or more other fields 502 of the event log 500 to select a key 704 from the one or more keys 704 and generating a field-key mapping 702 from the field 502 to the selected key 704.

Block 630 may include generating an event log parser extension that includes the one or more field-key mappings 702-1, 702-2. The parser extension may include data or software that may execute on an event log 500 to convert a raw event log to the standardized format according to the set 700 of field-key mappings 702-1, 702-2. In some implementations, the parser extension may include additional functionality to map event log 500 fields 502 to keys 704. For example, in one implementation, the parser extension may normalize the value of a key 704. In certain implementations, the parser extension may convert a field 502 into a different data format and include the differently formatted data as the key 704. In another example, the parser extension may convert a float to an integer. In certain implementations, the parser extension may automatically include certain data in the standardized format. For example, the parser extension may include keys 704 including data indicating the event type of the event log 500, the device that generated the event log 500, the software that generated the event log 500, or other keys 704.

Block 640 may include executing the parser extension on at least a subset of second multiple event logs 500 of second telemetry log data. The telemetry log data may include telemetry log data that is separate from the first telemetry log data, or there may be at least some overlap between the first and second telemetry log data. Similarly, the subset of second multiple event logs 500 may include event logs 500 that are not present in the first multiple event logs of block 610, or there may be at least some overlap between the subsets of first and second multiple event logs 500. In some implementations, the event logs 500 of the subset of the second multiple event logs 500 may include the event type associated with the parser extension.

Executing the parser extension may include the parser extension inserting one or more keys 704 into the data object generated by the base parser. FIG. 8 depicts a data object 800 in the standardized format. The data object 800 may be similar to the data object 460 of FIG. 4C. For example, the example data object 800 includes the keys 434-1, . . . , 434-7 and 462-1, . . . , 462-3. However, as can be seen in FIG. 8, the data object 800 also includes the keys 704-1, 704-2 provided by the set 700 of field-key mappings 702-1, 702-2 of the parser extension. The parsing subsystem 112 may generate the data object 800 by executing the base parser on the event log 500 to generate the keys 434-1, . . . , 434-7 and 462-1, . . . , 462-3 and then executing the parser extension on the event log 500 to generate the keys 704-1, 704-2 and insert them into the data object 800.

In some implementations, the parser extension may insert the keys 704-1, 704-2 into the data object 800 so that parsing subsystem 112 still generates the data object 800 even if the parser extension fails. In one or more implementations, the parser extension may generate a separate data object with the keys 704-1, 704-2 and the parsing subsystem 112 may combine the two data objects into the data object 800. In other implementations, the parsing subsystem 112 may not generate the data object 800 until both the parser and parser extension have executed on the event log 500.

In some implementations, the method 600 may include validating the event log parser extension. Validating the event log parser extension may occur after execution of block 630. Validating the parser extension may include testing the performance of the parser extension on at least a subset of the first multiple event logs 500 of the first telemetry log data. As discussed above, the first telemetry log data may include multiple event logs 500. The parsing subsystem 112 may obtain a subset of these event logs 500 and test the parser extension on the subset of event logs 500. Testing the parser extension may include the parser extension executing on the subset of event logs 500. This may include, for each event log 500 of the first multiple event logs 500, assigning, based on the one or more field-key mappings 702 of the parser extension, one or more values (or fields 502) of the event log 500 to one or more corresponding keys 704.

In one implementation, testing the performance of the parser extension may include determining whether the parser extension successfully executes on at least a predetermined percentage of the multiple event logs 500. The parser extension successfully executing on an event log 500 may include the parser extension executing on the event log 500 without producing an error or without producing a critical error. The parser extension successfully executing on an event log 500 may include the parser extension correctly mapping fields 502 in the event log 500 to their corresponding keys 704, based on the parser extension's set 700 of field key mappings 702. In response to the parser extension successfully executing on at least the predetermined percentage of the event logs 500, the parser extension may pass the performance test. Otherwise, the parser extension may fail the performance test.

In some implementations, testing the performance of the event log parser extension may include calculating a length of time of executing the parser extension on the multiple event logs 500 and determining whether the length of time is below a threshold time length. In response to the length of time being below the threshold time length, the parser extension may fail the performance test. The threshold amount of time may be based on an amount of time the base parser is able to execute on the multiple event logs. In response to the parser extension's length of time being below the threshold amount of time, the parser extension may pass the performance test. Otherwise, the parser extension may fail the performance test. As an example, the multiple event logs 500 may include 10,000 event logs 500 of the same type and that the base parser can execute on. The parsing subsystem 112 may cause the base parser and the parser extension to execute on the 10,000 event logs 500. The base parser may spend 20 seconds executing on the event logs 500 while the parser extension may spend 1.5 seconds executing on the event logs 500. The threshold amount of time may be 10% of the time the base parser spent executing the event logs 500, i.e., 2 seconds. Since the parser extension's length of time executing was below the threshold amount of time, the parser extension may pass the performance test. In one or more implementations, testing the performance of the parser extension may include analyzing other performance metrics of the parser extension. In response to the parser extension's performance metric being below a threshold metric, the parser extension may pass the performance test. Otherwise, the parser extension may fail the performance test. A performance metric may include an execution time of the parser extension, a computing resource used by the parser extension, the number of event logs 500 dropped by the parser extension, or other performance metrics.

In one or more implementations, testing the performance of the parser extension may include determining whether a key 704 of the one or more corresponding keys 704 does not include an associated value. In other words, testing the parser extension may include determining whether the converted event log 500, in its standardized form, includes any keys 704 that are empty. An empty key 704 may indicate that the parser extension is not functioning properly. In response to the parser extension converting at least a threshold amount of the subset of event logs 500 without empty keys 704, the parser extension may pass the performance test. Otherwise, the parser extension may fail the performance test.

In some implementations, testing the performance of the parser extension may include determining whether the value of a key 704 is within a predetermined range for the key 704. In some cases, the parser extension may normalize the value of the key 704. In response to the parser extension converting at least a threshold number of the subset of event logs 500 with values within their respective keys' 704 predetermined ranges, the parser extension may pass the performance test. Otherwise, the parser extension may fail the performance test. The predetermined range may include a range set by the user creating the parser extension or may be based on configuration data in the parsing subsystem 112. As an example, a key 704 may be configured to accept a value with a timestamp format. The key 704 may be configured so the predetermined range for the key 704 includes timestamps prior to the event log analytics system's 110 current time.

In certain implementations, testing the performance of the parser extension may include determining whether the parser extension set a key 704 to an incorrect value. In response to the parser extension setting a key 704 to an incorrect value for at least a threshold number of the subset of event logs 500, the parser extension may fail the performance test. Otherwise, the parser extension may pass the performance test.

In some implementations, validating the parser extension may occur after the parser extension has been generated. In certain implementations, certain validation functionality may occur while the parser extension is being created or configured. For example, in response to a set 700 of field-key mappings 702 including a certain key, the parsing subsystem 112 may require the set 430 of field-key mappings 432 or the set 700 of field-key mappings 702 to include a predetermined required key 434 or 704. Validating the parser extension may include determining whether the set 430 or 700 includes the predetermined required key 434 or 704. In response to the set 430 or 700 not including the predetermined required key 434 or 704, the parsing subsystem 112 may not validate the parser extension and may alert, using a user interface, the user creating or configuring the parser extension of the absence of the predetermined required key 434 or 704. The parsing subsystem 112 may include other validation functionality that occurs while a user is creating or configuring a parser extension.

In some implementations, it may not be practical or desired to execute the parser extension on all event logs 500 that the parser extension can accept as input. In such cases, the parsing subsystem 112 may configure the parser extension with a precondition, which may configure the parser extension to execute in response to an event log 500 satisfying the precondition. Thus, the method 600 may further include generating a precondition for the event log parser extension. The precondition may include an event log 500 including a predefined value associated with a predetermined field 402 or 502 of the one or more fields 402 or 502. Executing the parser extension on at least the subset of the second multiple event logs 500 (block 640) may include executing the parser extension on the subset of the second multiple event logs 500 in response to the event logs 500 of the subset of the second multiple event logs 500 satisfying the precondition.

As an example, the precondition may include the method field 402-6 including the value "GET." Thus, in response to an event log 500 including the value "GET" in the method field 402-6, the parsing subsystem 112 may execute the parser extension on the event log 500. In response to the event log 500 including some other value in the method field 402-6, the parsing subsystem 112 may not execute the parser extension on the event log 500 and may only execute the base parser on the event log 500.

In one or more implementations, the first event log 500 of block 610 may be contained within header data. The header data may include a syslog header or some other type of header data. The event log parser extension may be further configured to extract the first event 500 from the header data. The user may configure the parser extension to extract the event log 500 from the header data. Configuring the parser extension to extract the event log 500 may include the user providing pattern-matching data to the parser extension and configuring the parser extension to strip out portions of the data that satisfy the pattern-matching data (e.g., the header data that contains the event log 500) or to extract portions of the data that satisfy the pattern-matching data (e.g., the event log 500). The pattern-matching data may include a regular expression or some other type of pattern-matching data. When the parser extension has been configured to extract an event log 500 from header data, the parser extension may execute the extraction functionality during block 640. The parser extension may execute its extraction functionality prior to the base parser executing on the event log 500.

Figure 9:
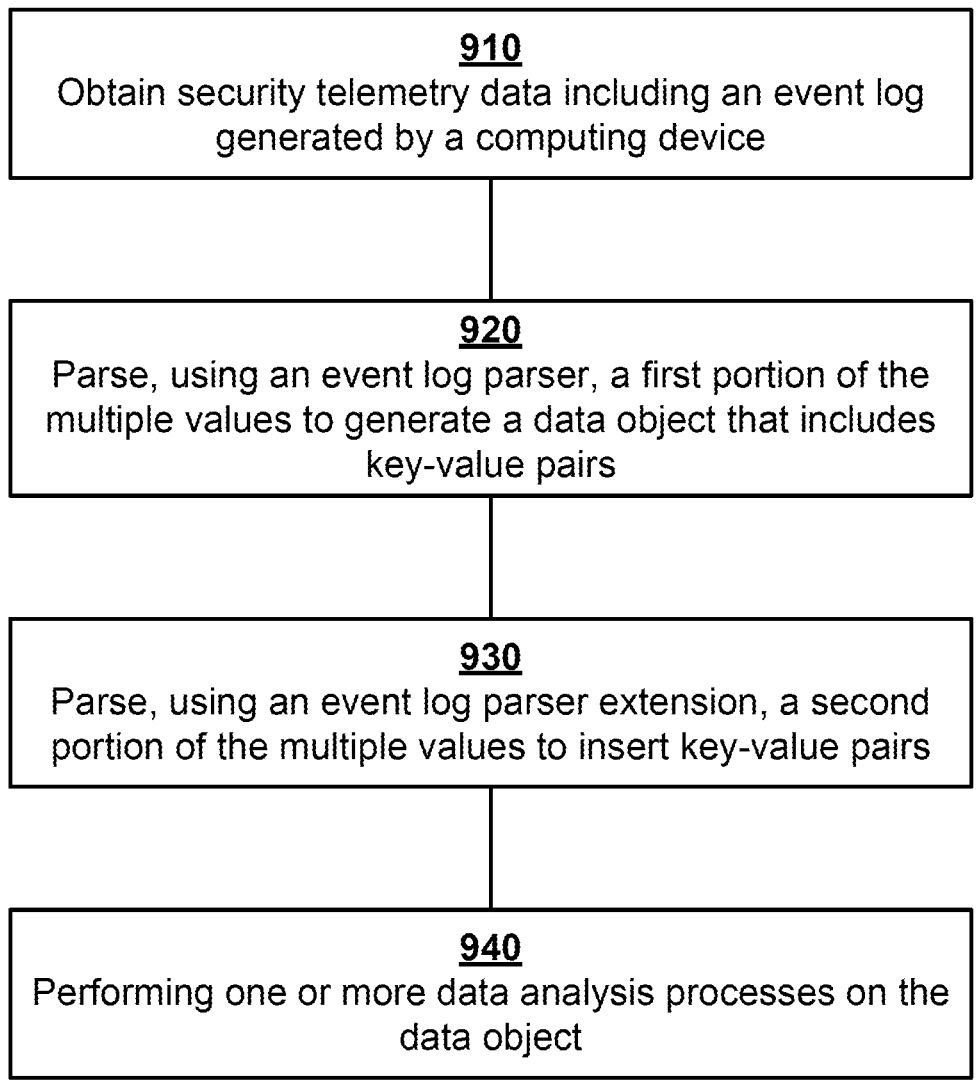
FIG. 9 depicts another flowchart illustrating an example method for practicing selected aspects of the present disclosure, in accordance with various embodiments.

FIG. 9 is a flowchart illustrating one embodiment of a method 900 for augmenting parsers by added parser stages, in accordance with some implementations of the present disclosure. A processing device, having one or more CPUs, memory devices communicatively coupled to the CPU(s), and/or GPU(s) can perform the method 900 and/or each of their individual functions, routines, subroutines, or operations. In certain implementations, a single processing thread can perform the method 900. Alternatively, two or more processing threads can perform the method 900, each thread executing one or more individual functions, routines, subroutines, or operations of the methods. In an illustrative example, the processing threads implementing the method 900 can be synchronized (e.g., using semaphores, critical sections, and/or other thread synchronization mechanisms). Alternatively, the processing threads implementing the method 900 can be executed asynchronously with respect to each other. Various operations of the method 900 can be performed in a different (e.g., reversed) order compared with the order shown in FIG. 9. Some operations of the method 900 can be performed concurrently with other operations. Some operations can be optional. In some embodiments, the parsing subsystem 112 or the event log analytics subsystem 114 may perform the method 900.

Block 910 can include obtaining telemetry log data. The telemetry log data may include an event log 500 generated by a computing device. The event log 500 may include one or more values. The one or more values may include one or more fields 502. The event log 500 being generated by the computing device may include the computing device itself generating the event log 500, a component of the computing device generating the event log 500, or software executing on the computing device generating the event log 500.

Block 920 may include parsing, using an event log parser, a first portion of the one or more values to generate a data object 800 that includes one or more first key-value pairs. Each key-value pair may include a first portion value from the first portion of the one or more values and a key 434 assigned to the first portion value. A first key-value pair may include a key 434 or 462, which may include the key name and its corresponding value. For example, as depicted in FIG. 800, a first key-value pair may include the key 434-2, which may include the key name "principal.ip" and the value "192.168.23.4."

Block 930 may include parsing, using an event log parser extension, a second portion of the plurality of values to insert one or more second key-value pairs into the data object 800. The second portion of the one or more values may include one or more values unrecognized by the event log parser. Each of the one or more second key-value pairs may include a second portion value from the second portion of the plurality of values and a key assigned to the second portion value. A second key-value pair may include a key 704, which may include the key name and its corresponding value. For example, as depicted in FIG. 800, a second key-value pair may include the key 704-1, which may include the key name "security.repeats" and the value "36." In some embodiments, the event log parser extension parsing the second portion of the plurality of values may include the parsing subsystem 112 executing the computer-readable instructions of the parser extension, which may include instructions indicating which event log 500 values map to which keys 704.

In some implementations, block 920 may include normalizing at least one value of the one or more values. Block 930 may include normalizing at least one value of the one or more values.

Block 940 may include performing one or more data analysis operations on the data object 800. Performing the one or more data analysis operations may include performing a statistical analysis on the data object 800, performing an inference calculation on the data object 800 using an machine learning model (MLM), inputting the data object 800 into an artificial intelligence (AI) model, or performing some other type of data analysis operation. In some implementations, block 940 may include performing the one or more data analysis operations on multiple data objects 800. Block 940 may include identifying trends in the one or more data objects 800 regarding use of the computing devices or software in the computing resources 130 or identifying a cyberattack on the computing resources 130. The event log analytics subsystem 114 may perform the block 940. In some implementations, a user of the computing resources 130 may view the results of the data analysis. The end user may use a user interface of a computing device that is in data communication with the event log analytics subsystem 114 to view the results.

It should be understood that an MLM can refer to a variety of MLMs. For example, an MLM can include an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. The ANN can undergo training to adjust the weights or adjust other features of the ANN. Such training may include inputting a training set and other information into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like.

In some implementations, at least a portion of the telemetry log data may include data in a structured format. Data in a structured format may include data that is organized into a recognized format. The structured data may include JSON, XML, CSV data, or some other structured format. In one or more implementations, at least a portion of the telemetry log data may include data in an unstructured format. Data in an unstructured format may include data that is not organized into a recognized format. Block 920 or block 930 may include the parser or parser extension extracting the event log 500 from the unstructured data for inclusion in the one or more values. Extracting the event log 500 may include extracting the event log 500 from a syslog header.

In one or more implementations, inserting the second portion of the one or more values into the data object 800 may include appending a value of the second portion of the one or more values to an existing set of values assigned to a key 434 or 704. In some implementations, a value of a key-value pair may be configured to include one or more values. The parser extension may be configured, based on a field-key mapping 702, to append a key 704 to a value of a key-value pair in the data object 800. The key-value pair may have been generated by the base parser or by the parser extension.

In one or more implementations, inserting the second portion of the one or more values into the data object 800 may include replacing an existing value in a key-value pair of the multiple key-value pairs with a value of the second portion of the multiple values. This may include replacing a value that includes multiple values with a single value. As an example, as depicted in FIG. 4B, the base parser may be configured to map the client IP address field 402-3 to the principal IP key 434-2 and the target IP address field 402-8 to the target IP key 434-7. However, a user may no longer need the principal IP key 434-7 and may wish to simplify the data object 800. Thus, the user may generate a parser extension that replaces the value in the principal IP key 434-2 in the data object 800 with the value of the target IP key 434-7 and removes the target IP key 434-7 from the data object. The parser extension may replace a value of a key-value pair generated by the base parser or may replace a key-value pair generated by the parser extension.

In some implementations, multiple parser extensions may be associated with a base parser. Executing the base parser and the multiple parser extensions may include the base parser executing to generate the data object 800, and then one or more associated parser extensions executing to insert additional keys 704 into the data object 800. A user may configure an order for the parser extensions to execute, or one or more parser extensions may execute simultaneously.

In one or more implementations, only the user that created the parser extension may be able to use the parser extension, or only users associated with the user that created the parser extension may be able to use the parser extension (e.g., users associated with the same set of computing resources 130). In certain implementations, a parser extension may be available for use by one or more users with access to the event log analytics system 110, even if those users did not create the extension or are not associated with the creating user.

While FIG. 4A depicts an event log 400 with nine fields 402, an event log 400 may have any number of fields 402. Similarly, while the set 430 of field-key mappings 432 in FIG. 4B includes seven field-key mappings 432, a set 430 of field-key mappings 432 may include any number of field-key mappings 432. While the data object 460 of FIG. 4C includes ten keys 434, 462, a data object 460 may include any number of keys 434, 462. While FIG. 5 depicts an event log 500 with eleven fields 402, 502, an event log 500 may have any number of fields 402, 502. Similarly, while the set 700 of field-key mappings 702 in FIG. 7 includes two field-key mappings 702, a set 700 of field-key mappings 702 may include any number of field-key mappings 702. While the data object 800 of FIG. 8 includes twelve keys 434, 462, 704, a data object 800 may include any number of keys 434, 462, 704.

Figure 10:
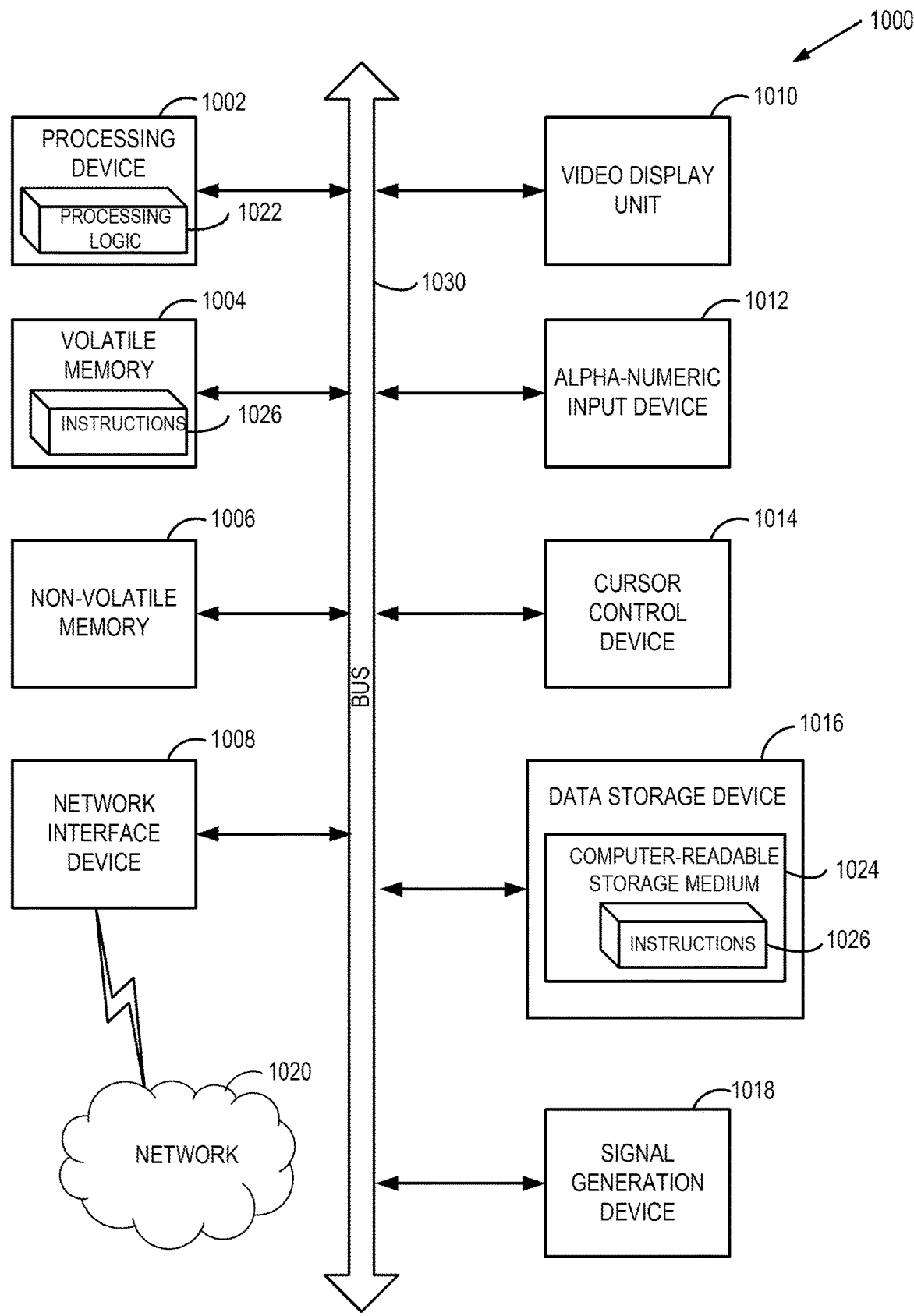
FIG. 10 depicts a block diagram of an example computer device capable of augmenting parsers by added parser stages, in accordance with some implementations of the present disclosure.

FIG. 10 is a block diagram illustrating an example computer system 1000, in accordance with implementations of the present disclosure. The computer system can be a computing device or other device discussed herein. The computer system 1000 can be the event log analytics system 110, the parsing subsystem 112, the event log analytics subsystem 114, the parser storage 120, the event log storage 122, a server 132, a network device 134, or a data storage device 136 of FIG. 1. The computer system 1000 can be a cloud management system 212 of FIG. 2B. The computer system 1000 can operate in the capacity of a server or an endpoint machine in endpoint-server network environment, or as a peer machine in a peer-to-peer (or distributed)

network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a volatile memory 1004 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 1006 (e.g., flash memory, static random access memory (SRAM), etc.), and a data storage device 1016, which communicate with each other via a bus 1030.

The processing device 1002 represents one or more general-purpose processing devices such as a microprocessor, CPU, GPU, or the like. More particularly, the processing device 1002 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 can also be one or more special-purpose processing devices such as an ASIC, a field programmable gate array (FPGA), a digital signal processor (DSP), network processor, or the like. The processing device 1002 is configured to execute instructions 1026 (e.g., for performing one or more of the methods 300, 600, 900) for performing the operations discussed herein.

The computer system 1000 can further include a network interface device 1008. The network interface device 1008 can assist in data communication between computing devices. The computer system 1000 also can include a video display unit 1010 (e.g., a liquid crystal display (LCD) or a cathode ray tube (CRT)), an input device 1012 (e.g., a keyboard, and alphanumeric keyboard, a motion sensing input device, touch screen), a cursor control device 1014 (e.g., a mouse), and a signal generation device 1018 (e.g., a speaker).

The data storage device 1016 can include a non-transitory machine-readable storage medium 1024 (also computer-readable storage medium) on which is stored one or more sets of instructions 1026 (e.g., for augmenting parsers by added parser stages and other functionality disclosed herein) embodying any one or more of the methodologies or functions described herein. The instructions 1026 can also reside, completely or at least partially, within the volatile memory 1004 and/or within the processing device 1002 during execution thereof by the computer system 1000, the volatile memory 1004 and the processing device 1002 also constituting machine-readable storage media. The instructions 1026 can further be transmitted or received over a network 1020 via the network interface device 1008.

In one implementation, the instructions 1026 include instructions for augmenting parsers by added stages. While the computer-readable storage medium 1024 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 300, 600, 900 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    identifying one or more fields associated with a first event log of a first plurality of event logs of first telemetry log data;
    for a first field in the one or more fields:
        selecting a key from a plurality of keys, wherein the key represents a data field in a predefined format, and
        generating a field-key mapping comprising a mapping from the first field to the selected key;
    generating an event log parser extension that includes the one or more field-key mappings; and
    executing the event log parser extension on at least a subset of a second plurality of event logs of second telemetry log data.

2. The method of claim 1:
    further comprising generating a precondition for the event log parser extension, wherein the precondition comprises the first event log including a predefined value associated with the first field; and
    wherein executing the event log parser extension on at least the subset of the second plurality of event logs comprises executing the event log parser extension on the subset of the second plurality of event logs in response to the event logs of the subset of the second plurality of event logs satisfying the precondition.

3. The method of claim 1, wherein:
    the first event log includes an event type;
    the event log parser extension is associated with the event type; and
    the event logs of the subset of the second plurality of event logs include the event type.

4. The method of claim 1, wherein selecting the key from the plurality of keys comprises obtaining a user selection of the selected key.

5. The method of claim 1, further comprising:
    associating the event log parser extension with an event log parser; and
    prior to executing the event log parser extension on at least the subset of the second plurality of event logs, executing the associated event log parser on the subset of the second plurality of event logs.

6. The method of claim 1, wherein:
    the first event log is contained within a syslog header; and
    the event log parser extension further comprises extracting the first event log from the syslog header.

7. The method of claim 1, further comprising validating the event log parser extension by testing a performance of the event log parser extension on at least a subset of the first plurality of event logs of the first telemetry log data.

8. The method of claim 7, wherein testing the performance of the event log parser extension comprises determining whether the event log parser extension successfully executes on at least a predetermined percentage of the first plurality of event logs.

9. The method of claim 7, wherein testing the performance of the event log parser extension comprises:
   calculating a length of time of executing the event log parser extension on the first plurality of event logs; and
   determining whether the length of time is below a threshold time length.

10. The method of claim 7, wherein testing the performance of the event log parser extension comprises, for each event log in the first plurality of event logs, assigning, based on the one or more field-key mappings of the event log parser extension, one or more values of the event log to one or more corresponding keys.

11. The method of claim 10, wherein testing the performance of the event log parser extension comprises:
   normalizing a value of the one or more values; and
   determining whether the normalized value is within a predetermined range for the key associated with the value.

* * * * *